United States Patent [19]
Kanai et al.

[11] Patent Number: 5,668,674
[45] Date of Patent: Sep. 16, 1997

[54] REFLECTING PRISM AND A FINDER SYSTEM HAVING A REFLECTING PRISM

[75] Inventors: Moriyasu Kanai; Sachio Hasushita, both of Tokyo, Japan

[73] Assignee: Asahi Kogaku Kogyo Kabushiki Kaisha, Tokyo, Japan

[21] Appl. No.: 356,454

[22] Filed: Dec. 15, 1994

[30] Foreign Application Priority Data

Dec. 28, 1993 [JP] Japan .................. 5-338274

[51] Int. Cl.⁶ .............. G02B 5/04; G02B 27/00; G02B 27/14; G02B 1/10
[52] U.S. Cl. ............ 359/835; 359/831; 359/834; 359/613; 359/629; 359/636; 359/640; 359/580; 359/583; 396/89; 396/385
[58] Field of Search ............... 359/835, 831, 359/833, 837, 408, 407, 410, 599, 606, 608, 611, 615; 354/162, 163, 164, 165, 166, 221, 222, 223, 224

[56] References Cited

U.S. PATENT DOCUMENTS

| | | | |
|---|---|---|---|
| 4,109,263 | 8/1978 | Johnson | 354/150 |
| 4,119,980 | 10/1978 | Baker | 354/150 |
| 5,095,326 | 3/1992 | Nozaki et al. | 354/222 |
| 5,233,381 | 8/1993 | Abe | 354/222 |
| 5,235,460 | 8/1993 | Abe | 359/431 |
| 5,276,552 | 1/1994 | Kohmoto et al. | 359/601 |
| 5,491,528 | 2/1996 | Takato et al. | 354/225 |

FOREIGN PATENT DOCUMENTS

| | | | |
|---|---|---|---|
| 597280 | 5/1994 | European Pat. Off. | 354/222 |
| 2543160 | 4/1976 | Germany | 354/223 |
| 403288135 | 12/1991 | Japan | 354/225 |
| 92011565 | 7/1992 | WIPO | 354/222 |

*Primary Examiner*—Paul M. Dzierzynski
*Assistant Examiner*—Mohammad Y. Sikder
*Attorney, Agent, or Firm*—Greenblum & Bernstein P.L.C.

[57] ABSTRACT

A double Porro prism having an incident surface, an exit surface, and a plurality of reflecting surfaces for internally reflecting light rays from the incident surface to the exit surface. The plurality of reflecting surfaces having a final reflecting surface that is positioned near the exit surface. The double Porro prism also has a ghost preventing surface that is formed between a ridge of the final reflecting surface and a ridge of the exit surface.

19 Claims, 7 Drawing Sheets

REFLECTING PRISM AND A FINDER SYSTEM HAVING A REFLECTING PRISM

BACKGROUND OF THE INVENTION

The present invention relates to a reflecting prism such as a double Porro prism for changing a direction of propagation and/or an orientation of an image of an object. More specifically, the present invention relates to a reflecting prism for erecting an image used in a finder system of a camera.

A real image finder of a camera requires an erecting system for erecting an orientation of an image formed by an objective lens system. A double Porro prism is used in a conventional real image finder.

FIG. 8 shows a conventional double Porro prism 3. A light ray L1 is incident on a surface 3a and internally reflected by first, second, third and fourth reflecting surfaces R1, R2, R3 and R4 and exits the double Porro prism 3 and a surface 3b.

FIG. 9 shows a real image finder having the conventional double Porro prism 3. The double Porro Prism 3 is shown "unfolded" (i.e., transformed such that the optical axis is shown as a straight line). The light rays from an object are focused by an objective lens 1 on a screen 2. The image on the screen 2 is erected by the double Porro prism 3, and a viewed by a user through an eyepiece lens 4.

The surfaces 3a and 3b are coated with an anti-reflection coating, while the four reflecting surfaces R1 through R4 are coated so as to improve their reflectivity. Other surfaces such as an "unused surface" 3c are formed as diffusing surfaces. The term "unused surface" in this specification refers to surfaces which are not used for transmission of light incident on the prism (i.e., light L1).

In order to make the finder compact, the erecting system should be as small as possible. However, when the small erecting system is used, a width d of an optical path of the double Porro prism 3 becomes narrow. With this construction, a small amount of light (corresponding to a peripheral part of an image and shown as a dotted light ray in FIGS. 9 and 10) may be totally internally reflected by the surface 3b to be incident on the reflecting surface R4 of the prism 3. In FIG. 9, the surface 3b is mapped onto surfaces 3b' and 3b". The surface 3b' represents the surface 3b when light passes through it, whereas the surface 3b" represents the surface 3b when light is totally internally reflected by the surface 3b.

Therefore, when the small amount of light is reflected by the surface 3b (shown as surface 3b" in FIG. 9) it is reflected by the surface R4 and then transmitted through the surface 3b (shown as surface 3b' in FIG. 9) to the eyepiece lens 4. This results in ghost reflections occurring which reduce the clarity of the image seen through the eyepiece lens 4.

SUMMARY OF THE INVENTION

It is therefore an object of the present invention to prevent the ghost ray from being incident at the eyepiece lens of the finder system.

According to one aspect of the present invention, a double Porro prism may include an incident surface, an exit surface, and a plurality of reflecting surfaces for internally reflecting light rays from the incident surface to the exit surface. A final reflecting surface is positioned near the exit surface, and a ghost preventing surface is formed between a ridge of the final reflecting surface and a ridge of the exit surface.

Preferably, the incident surface, the exit surface and the plurality of reflecting surfaces are formed as light transmission surfaces, and other surfaces, including the ghost preventing surfaces are formed as anti-reflection surfaces.

According to another aspect of the present invention, a double Porro prism may be provided with an incident surface, an exit surface, a plurality of reflecting surfaces for internally reflecting light rays from the incident surface to the exit surface, and a plurality of unused surfaces. A plane containing one of the unused surfaces faces in a similar direction as the exit surface, and is positioned between a plane containing the exit surface and a plane containing the incident surface.

According to a further aspect of the present invention, a finder system may include an objective lens, a double Porro prism for erecting an image formed by the objective lens, and an eyepiece lens through which light rays from the double Porro prism are guided to an eye. The double Porro prism may include an incident surface through which the light rays from the objective lens are incident, an exit surface through which the light rays exit to the eyepiece lens, a plurality of reflecting surfaces for internally reflecting light rays from the incident surface to the exit surface, and a plurality of unused surfaces. A plane containing one of the unused surfaces is parallel to the exit surface and positioned between the exit surface and the incident surface along the optical axis.

According to a still further aspect of the present invention, a double Porro prism may include an incident surface, an exit surface, and a plurality of reflecting surfaces for internally reflecting light rays from the incident surfaces to the exit surface. The exit surface may include a transparent parallel plate attached thereon such that the light rays exit the plate from a plate exit surface.

DESCRIPTION OF THE EMBODIMENTS

Figure 1:
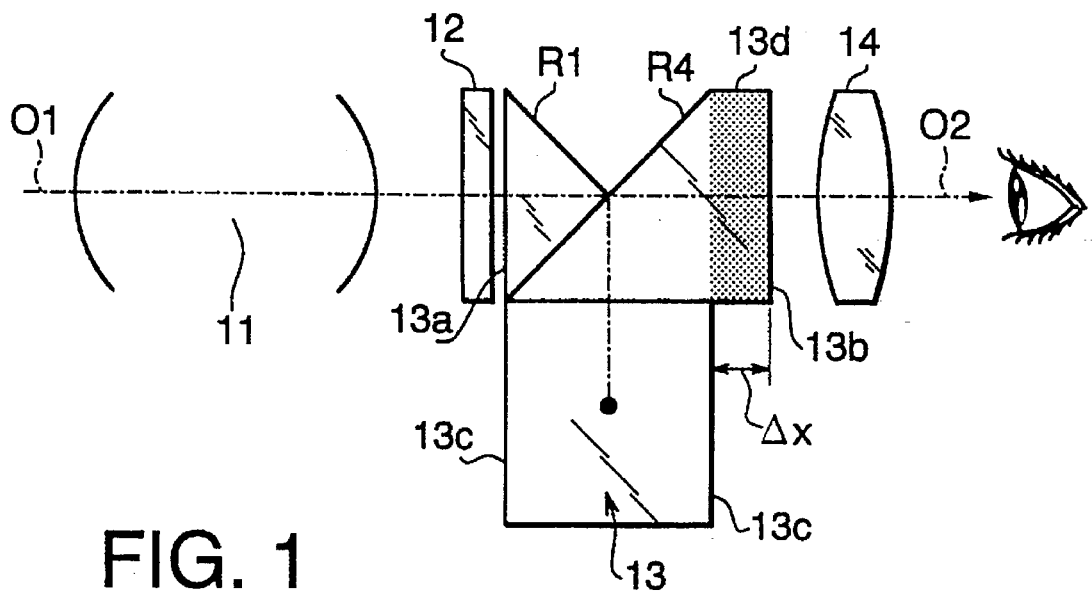
FIG. 1 is a side view of a finder system embodying the present invention.
Figure 2:
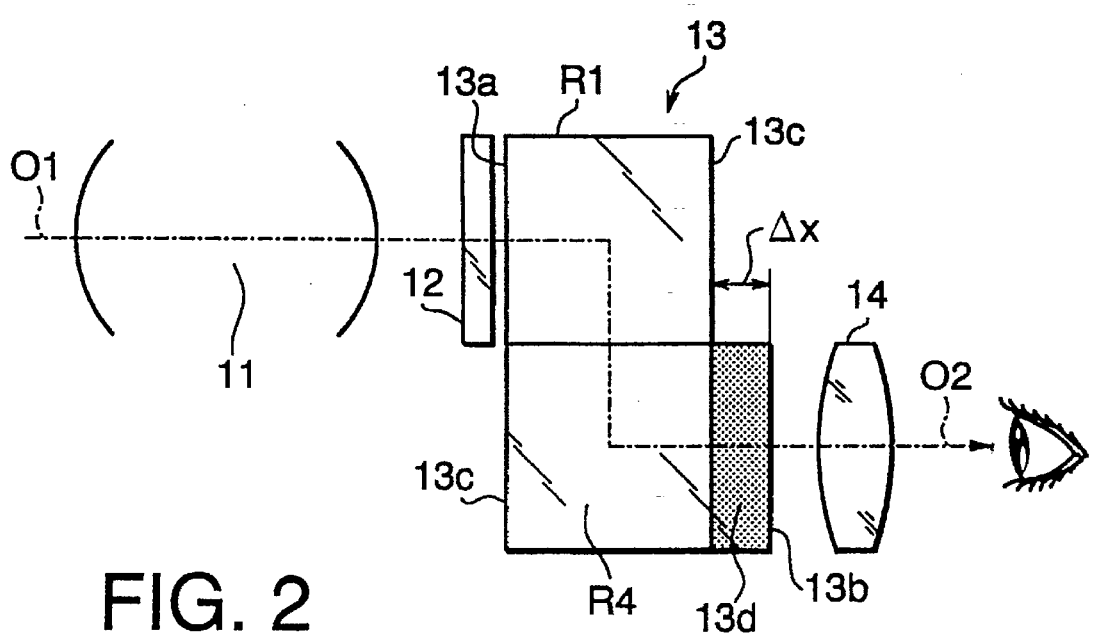
FIG. 2 is a top view of the finder system shown in FIG. 1.
Figure 3:
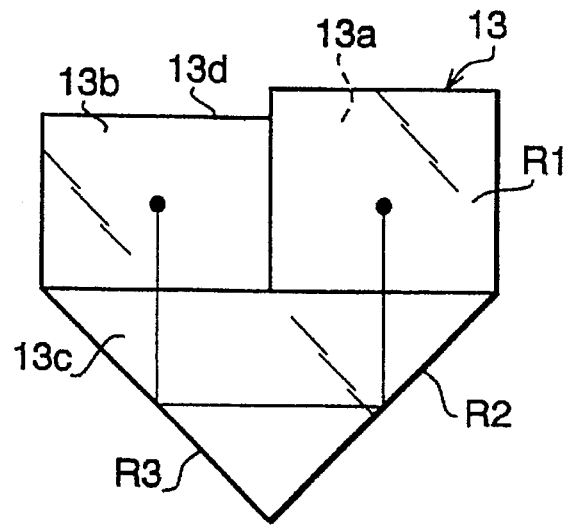
FIG. 3 is a front view of a reflecting prism used in the finder system shown in FIG. 1.

FIGS. 1 and 2 shows a real image finder that has a reflecting prism embodying the present invention.

The light from an object is imaged by an objective lens 11 on a screen 12. The image on the screen 12 is erected by a double Porro prism 13, and viewed through an eyepiece lens 14.

As shown in FIGS. 1, 2, 3 and 4, the double Porro prism 13 includes a surface 13a, first, second, third and fourth reflecting surface R1, R2, R3 and R4, a surface 13b, an unused surface 13c and a ghost preventing surface 13d. The fourth surface R4 is a final reflecting surface that is positioned near the surface 13b in this embodiment.

The double Porro prism 13 is arranged so that an optical axis O1 of the objective lens 11 passes through the center of the surface 13a, and an optical axis O2 of the eyepiece lens 14 passes through the center of the surface 13b.

When the light is incident along the optical axis O1, the ray is internally reflected on the first, second, third and fourth reflecting surfaces R1, R2, R3 and R4, respectively, and then exits through surface 13d along the optical axis O2.

The first and fourth reflecting surfaces R1 and R4 are perpendicular to each other and are inclined by 45 degrees to the surfaces 13a and 13b, respectively. The second and third reflecting surfaces R2 and R3 are perpendicular to each other.

The reflecting surfaces R1 through R4 are coated by a reflection coating such as silver, and the surfaces 13a and 13b are coated by an anti-reflection coating. The other surfaces such as the unused surface 13c and the ghost preventing surface 13d are formed as diffused surfaces. Further, the optical axes O1 or O2 do not intersect the unused surface 13c or ghost preventing surface 13d.

Figure 4:
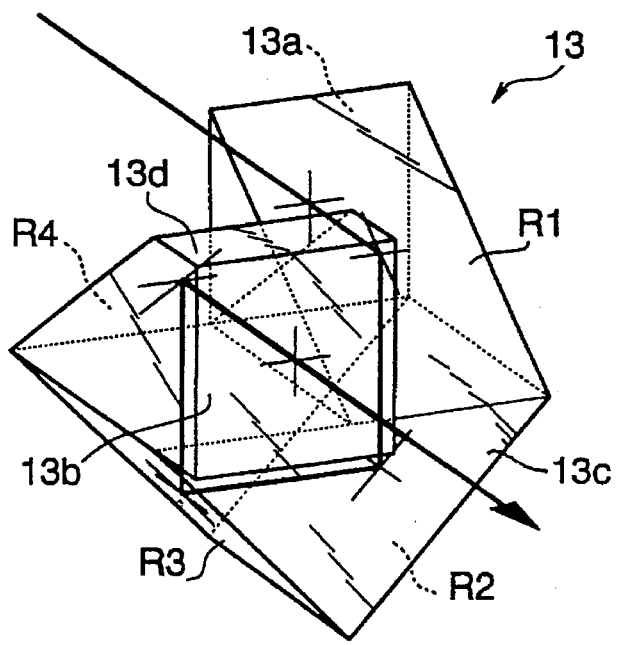
FIG. 4 is a perspective view of the reflecting prism shown in FIG. 3.

The unused surface 13c is parallel to the surface 13b. The ghost preventing surface 13d is formed between a ridge of the fourth reflecting surface R4 and a ridge of the surface 13b as shown in FIGS. 1, 2 and 4. Further, the ghost preventing surface 13d is a planar surface and is perpendicular to the surface 13b.

As described above, a plane containing the surface 13b is displaced from a plane containing the unused surface 13c, along the optical axis and towards the exiting direction of the light. This prevents the light from being directly incident on the surface 13b before the light is reflected by the fourth reflecting surface R4.

Figure 5:
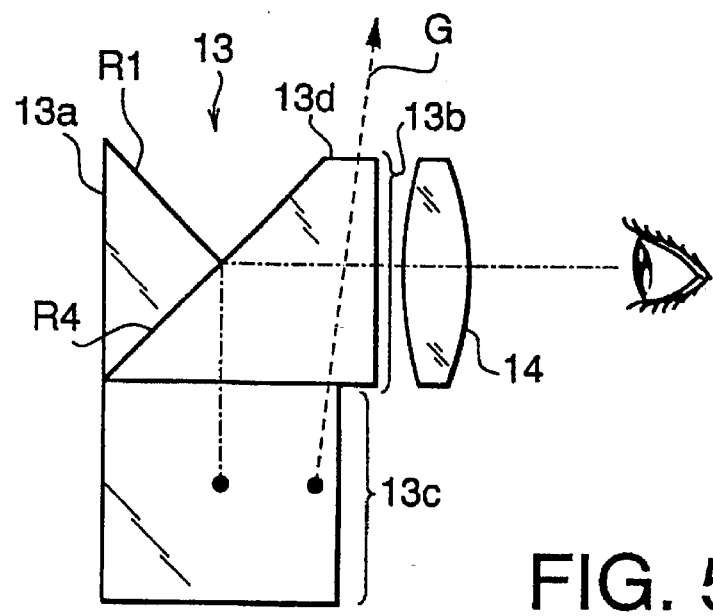
FIG. 5 is a side view of the reflecting prism shown in FIG. 3 including a ghost light ray.

Since the ghost preventing surface 13d is formed between the fourth reflecting surface R4 and the surface 13b, a ghost ray G shown by a dotted line in FIG. 5 is not reflected by the surface 13b and exits through the ghost preventing surface 13d.

Figure 6:
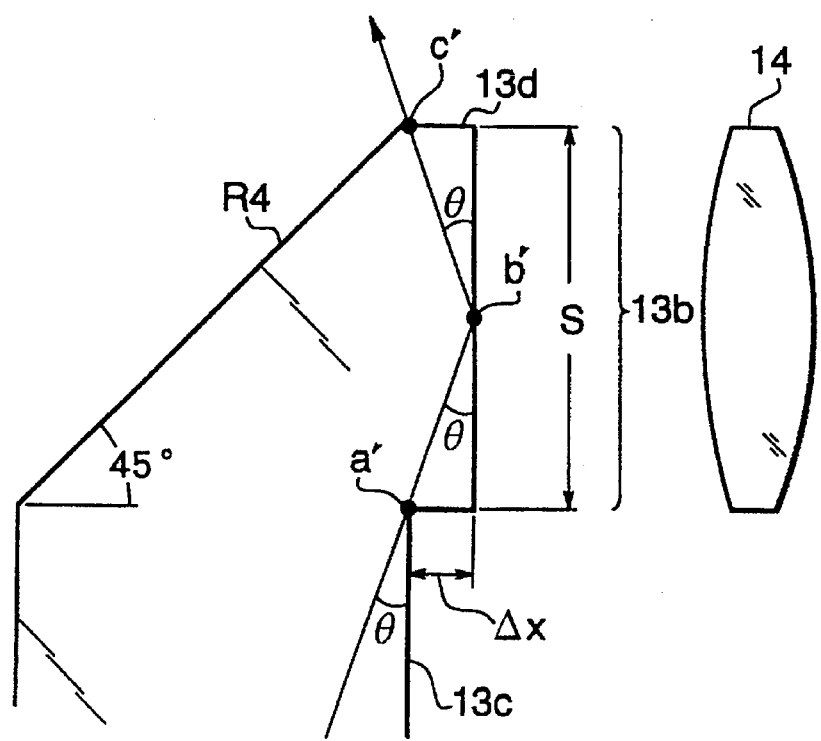
FIG. 6 is an enlarged view of the reflecting prism shown in FIG. 5.

Moreover, if the ghost ray G is totally internally reflected by the surface 13b as shown in FIG. 6, the reflected light is not reflected by the fourth reflecting surface R4 and also exits through the ghost preventing surface 13d.

The ghost rays, therefore, do not exit through the surface 13b, and do not affect the image seen through the eyepiece lens 17.

Figure 7:
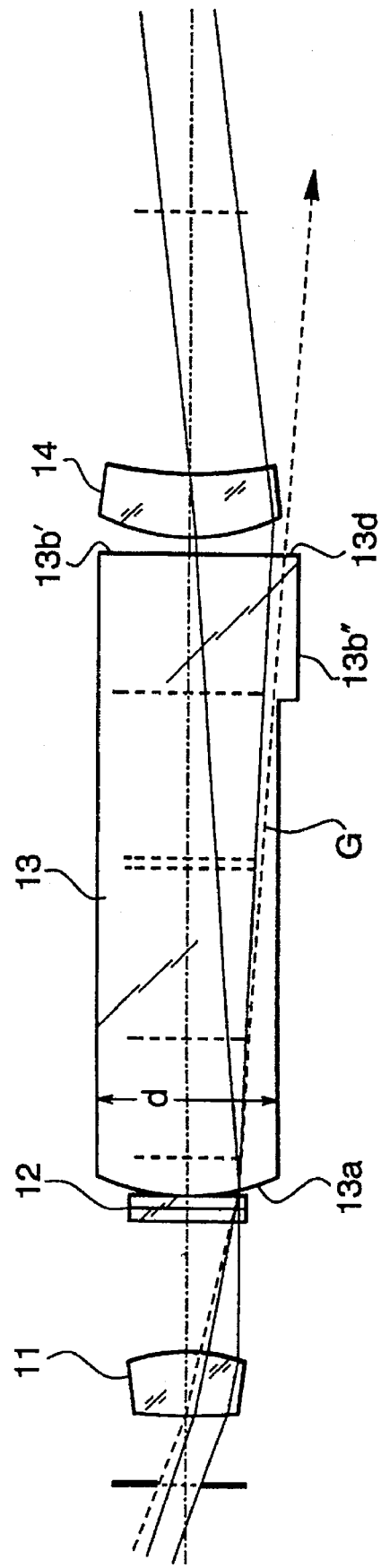
FIG. 7 is an "unfolded" view of the reflecting prism shown in FIG. 5.
Figure 8:
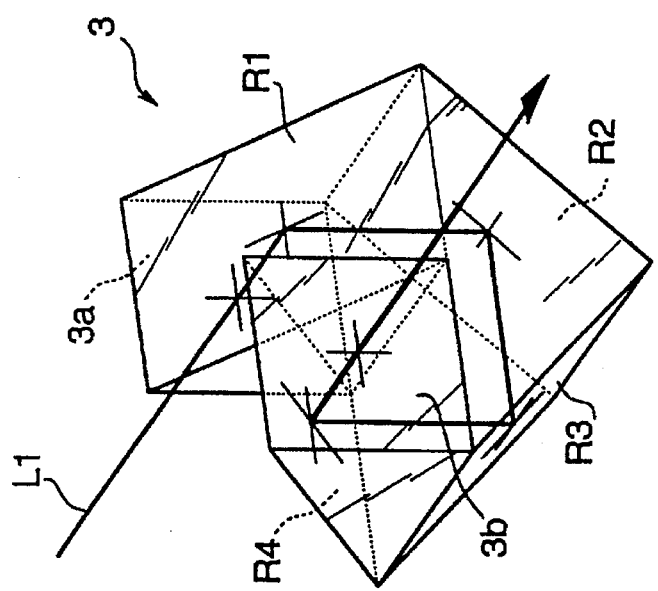
FIG. 8 is a perspective view of a conventional double Porro prism.
Figure 9:
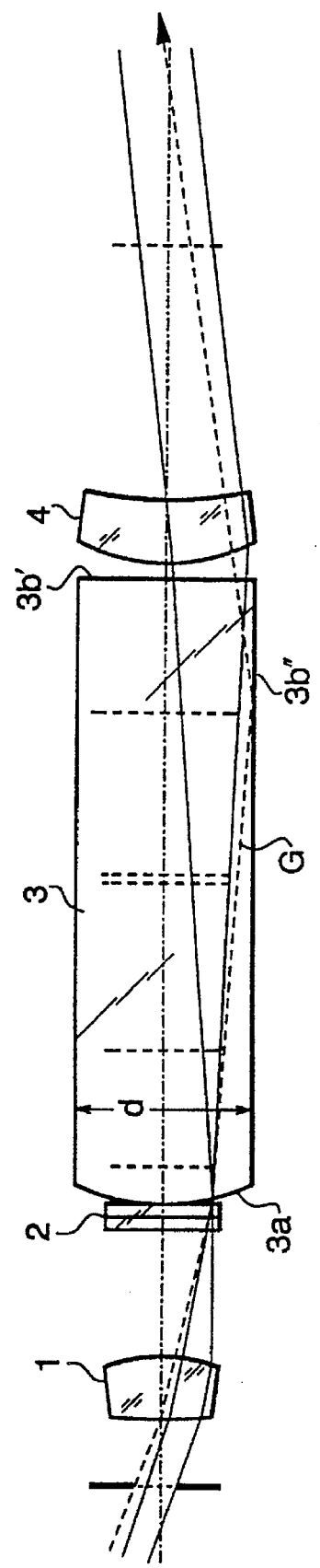
FIG. 9 is an "unfolded" view of the conventional double Porro prism shown in FIG. 8.
Figure 10:
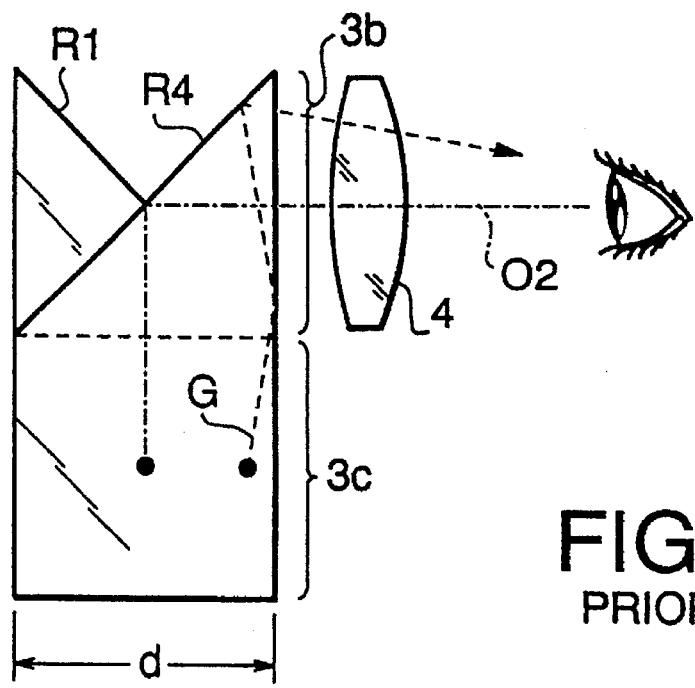
FIG. 10 is a side view of the conventional double Porro prism of FIG. 8 showing a ghost ray.
Figure 11:
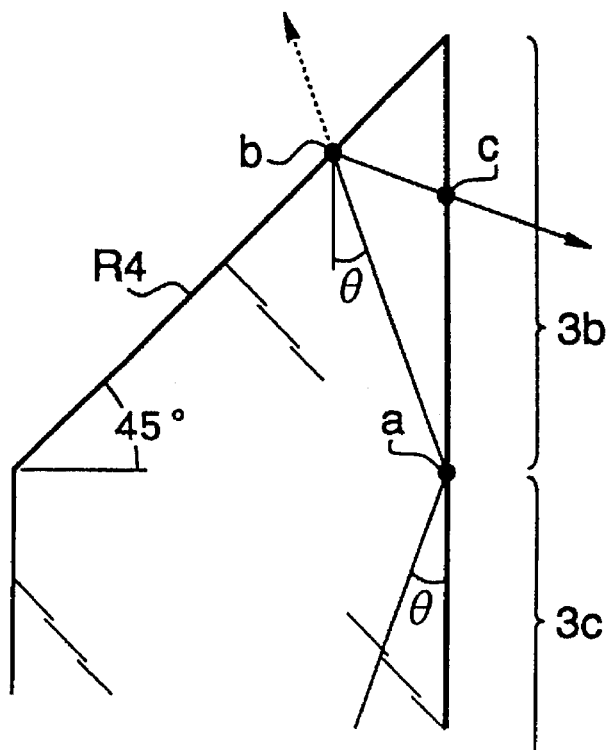
FIG. 11 is an enlarged view of FIG. 10.

FIG. 7 shows an "unfolded" view of the double Porro prism 13 embodying the present invention. The term "unfolded" refers to the transformation of the prism to an optically equivalent element having an optical axis which extends along a straight line. In FIG. 7, surface 13b is mapped onto surfaces 13b' and 13b". The surface 13b' represents the surface 13b when light is transmitted through the surface 13b, while the surface 13b" represent the surface 13b when light is totally internally reflected at surface 13b. As shown in FIG. 7, the ghost ray G is not incident on the surface 13b", but passes through the surface 13d. Therefore, the ghost ray G is not incident on the eyepiece lens 14.

As shown in FIG. 1 and described above, the plane containing the surface 13b is displaced by a distance $\Delta x$ relative to the plane containing the unused surface 13c, along the optical axis O2. Further, the plane containing the unused surface 13c lies between a plane containing the surface 13a and the plane containing the surface 13b.

Figure 12:
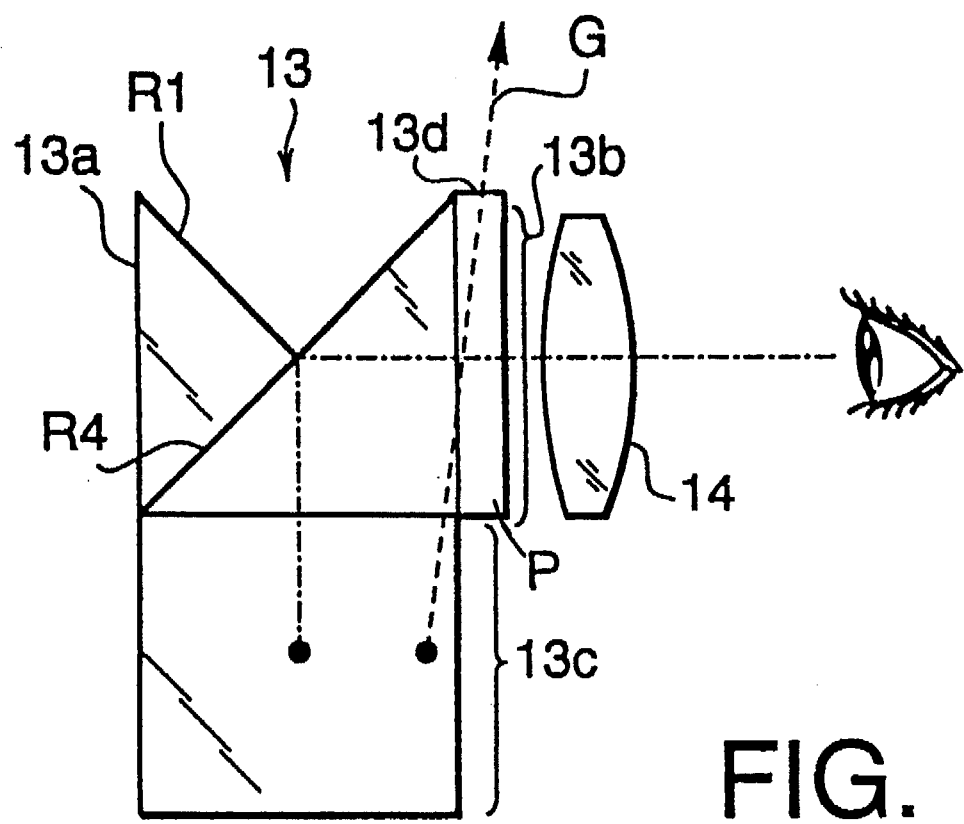
FIG. 12 is a side view of a finder system having a modification of the embodiment shown in FIG. 1.

In a modified embodiment of the present invention, the above described construction may be achieved by attaching a transparent parallel plate P to the double Porro prism, as shown in FIG. 12. In this case the transparent parallel plate P is attached to the double Porro prism resulting in the surface 13b which is displaced towards the eyepiece lens 14 relative to the surface 13c, as shown in FIG. 12. This is similar to the relative positions of the surfaces 13b and 13c shown in FIG. 1. Further, the ghost preventing surface 13d shown in FIG. 1 would be formed by a side surface of the transparent parallel plate P. Therefore, the prevention of the transmission of the ghost ray G can be accomplished with this modified embodiment of the double Porro prism.

A method for determining a value of $\Delta x$ will be described below with reference to FIG. 6.

In order that the ghost ray G is incident on the eyepiece lens 14, three conditions described below must be met. Therefore, if one of the conditions is not met, the ghost ray G will not be incident on the eyepiece lens 14.

The first condition to be satisfied is that the light must be totally internally reflected at surface 13b. The second condition to be satisfied is that the totally internally reflected ray must be incident on the reflecting surface R4. The third condition to be satisfied is that the ghost ray G incident on the reflecting surface R4 must be reflected such that it exits through the surface 13d.

This results in an angle $\theta$ satisfying the following equation (1):

$$\theta < 45° - \sin^{-1}(1/n) \qquad (1)$$

where $\theta$ is the complementary angle to an angle of incidence of the ghost ray G on the surface 13b, and n=the refractive index of the prism material.

Therefore, if the ghost ray G is not to be transmitted to the eyepiece lens 14, equation (1) must not be satisfied. Thus, in order to prevent the ghost ray from being transmitted, equation (2) below must be satisfied:

$$\theta > 45° - \sin^{-1}(1/n) \qquad (2)$$

if n=1.5, then $\theta > 3.2°$.

Further, since this minimum angle of $\theta$ occurs at the center point of surface 13b, then $\Delta X > S/2$ (Tan $\theta$). Also, since $S \approx X/4$ where X is the length of the optical axis in the prism, and S is the width of the surface 13b, then $$\Delta X > X/8 \text{ (Tan 3.2°)}$$

or $\Delta X > 0.007X$.

If this condition is met, then the ghost ray G will not be incident on the eyepiece lens 14.

As shown above, by displacing the surface 13b a small distance in the optical axis direction towards the eyepiece lens 14, such that the ghost ray exit surface 13d is formed, the ghost ray G will be prevented from being incident on the eyepiece lens 14. This improves the image seen through the eyepiece 14. Further, since the amount of displacement of the surface 13b is less than 1% of the length of the optical axis in the prism, the overall size of the prism and the finder system is not substantially changed.

The present disclosure relates to subject matter contained in Japanese patent application No. H5-338274 (filed on Dec. 28, 1993) which is expressly incorporated herein by reference in its entirety.

What is claimed is:

1. A double Porro prism comprising:
   an incident surface for admitting light rays;
   an exit surface for emitting said light rays;
   a plurality of reflecting surfaces for internally reflecting said light rays from said incident surface to said exit surface, said plurality of reflecting surfaces comprising a final reflecting surface that is positioned near said exit surface, light rays incident onto said incident surface, along a first axis which is perpendicular to said incident surface, being emitted from said exit surface, along a second axis which is perpendicular to said exit surface, said first axis and said second axis extending in parallel; and
   a ghost preventing surface that is formed between a ridge of said final reflecting surface and a ridge of said exit surface, said ghost preventing surface comprising a flat surface, a plane containing said ghost preventing surface intersecting a plane containing said exit surface, said ghost preventing surface being space from said first axis.

2. The double Porro prism according to claim 1, wherein said incident surface, said exit surface and said plurality of reflecting surfaces are formed as light transmission surfaces and other surfaces including said ghost preventing surface are formed as anti-reflection surfaces.

3. The double Porro prism according to claim 2, wherein said other surfaces are formed as diffusing surfaces.

4. The double Porro prism according to claim 2, wherein said incident surface and said exit surface are coated with an anti-reflection coating.

5. The double Porro prism according to claim 1, wherein said final reflecting surface is inclined to said exit surface by 45° and said ghost preventing surface is perpendicular to said exit surface.

6. The double Porro prism according to claim 1, said plurality of reflecting surfaces comprising four reflecting surfaces, said final reflecting surface comprising a fourth reflecting surface.

7. A double Porro prism comprising:
   an incident surface for admitting light rays;
   an exit surface for emitting said light rays;
   a plurality of reflecting surfaces for internally reflecting said light rays from said incident surface to said exit surface; and
   a plurality of unused surfaces,
   wherein a plane, containing one of said unused surfaces and facing a direction similar to a direction faced by said exit surface, is positioned between a plane containing said exit surface and a plane containing said incident surface, said plane containing one of said unused surfaces being spaced from said plane containing said incident surface and being spaced from said plane containing said exit surface.

8. The double Porro prism according to claim 7, wherein said incident surface, said exit surface and said a plurality of reflecting surfaces are formed as transmission surfaces and said plurality of unused surfaces are formed as anti-reflection surfaces.

9. The double Porro prism according to claim 8, wherein said unused surfaces are formed as diffusing surfaces.

10. The double Porro prism according to claim 8, wherein said incident surface and said exit surface are coated with an anti-reflection coating.

11. The double Porro prism according to claim 8, wherein said incident surface and said exit surface are coated with an anti-reflection coating.

12. The double Porro prism according to claim 1, said ghost preventing surface having a length, along a direction of an optical axis, greater than 0.007x, wherein x represents a length of the optical axis within said prism.

13. The double Porro prism according to claim 7, wherein said plane containing one of said unused surfaces is positioned a predetermined distance from a plane containing said exit surface, said predetermined distance being greater than 0.007x, wherein x represents a length of the optical axis within said prism.

14. A finder system having an objective lens, a double Porro prism for erecting an image formed by said objective lens, an eyepiece lens through which light rays from said double Porro prism are guided to an eye, said double Porro prism comprising:
   an incident surface onto which light rays from said objective lens are incident;
   an exit surface from which the light rays exit to said eyepiece lens;
   a plurality of reflecting surfaces for internally reflecting light rays from said incident surface to said exit surface; and
   a plurality of unused surfaces,
   wherein a plane containing one of said unused surfaces that is parallel to said exit plane is positioned between said exit surface and said incident surface along an optical axis, said plane containing one of said unused surfaces being spaced from said exit surface and from said incident surface along the optical axis.

15. The double Porro prism according to claim 14, wherein said unused surfaces are formed as diffusing surfaces.

16. The finder system according to claim 14, said plane containing one of said unused surfaces being positioned a predetermined distance along an optical axis from said exit surface, said predetermined distance being greater than 0.007x, wherein x represents a length of the optical axis within said prism.

17. A double Porro prism comprising:
   an incident surface for admitting light rays;
   an exit surface for emitting said light rays;
   a plurality of reflecting surfaces for internally reflecting said light rays from said incident surface to said exit surface, said plurality of reflecting surfaces including a final reflecting surface positioned adjacent said exit surface,
   wherein said exit surface includes a transparent parallel-surfaced plate attached thereon such that said light rays exit said prism from an exit surface of said transparent parallel-surfaced plate; and
   a plane containing said exit surface of said transparent parallel-surfaced plate being spaced from a plane containing said exit surface, in an exit direction of said light ray, a side surface of said transparent parallel-surfaced plate, into which ghost light is incident without being reflected by said final reflecting surface, comprising a ghost preventing surface.

18. The double Porro prism according to claim 17, a thickness of said transparent parallel plate, in a direction along an optical axis, being greater than 0.007x, wherein x represents a length of the optical axis within said prism.

19. The double Porro prism according to claim 17, said incident surface and said exit surface being coated with an anti-reflection coating.

* * * * *

UNITED STATES PATENT AND TRADEMARK OFFICE
CERTIFICATE OF CORRECTION

PATENT NO. : 5,668,674 Page 1 of 1
DATED : September 16, 1997
INVENTOR(S) : M. Kanai et al.

It is certified that error appears in the above-identified patent and that said Letters Patent is hereby corrected as shown below:

Column 5,
Line 65, change "8" to -- 7 --.

Signed and Sealed this

Twelfth Day of February, 2002

*Attest:*

*Attesting Officer*

JAMES E. ROGAN
*Director of the United States Patent and Trademark Office*